United States Patent Office 3,276,959
Patented Oct. 4, 1966

3,276,959
STABILIZED STEROID COMPOSITIONS
Ludwig Ritter, Horst Kraft, and Julius Friedrich, Lippe, Germany, assignors to Hefa G.m.b.H., Lippe, Germany
No Drawing. Filed Aug. 8, 1963, Ser. No. 300,925
3 Claims. (Cl. 167—65)

The present invention relates to steroid solutions and to a method of making the same. More particularly, the present invention is concerned with stable aqueous solutions of partial esters of a steroid alcohol and polybasic acid.

It is known that semi-esters of succinic acid or other polybasic organic acids and of steroid alcohols such as cholesterol, prednisone, prednisolone, cortisone, hydrocortisone and the like are useful as intermediates in the preparation of valuable pharmaceutic agents. The usefulness of the semi-esters or partial esters is partly due to the fact that the same, in the form of their salts, are easily soluble in water. However, it is known that these partial esters are relatively easily saponifiable and that aqueous solutions thereof tend to cloud and to change their pH. For this reason, it is general practice to produce the aqueous solutions of these partial esters only a short time prior to use thereof. It is a great disadvantage of proceeding in this manner that it is not possible to store the aqueous solutions or to produce larger quantities thereof from which required smaller amounts may be withdrawn from time to time.

It is therefore an object of the present invention to overcome the above discussed difficulties and disadvantages.

It is a further object of the present invention to provide a stable aqueous solution of a partial ester of a steroid alcohol and a polybasic acid which can be stored for prolonged periods of time without clouding or saponification, as well as a method for producing such stable solution in a simple and economical manner.

Other objects and advantages of the present invention will become apparent from a further reading of the description and of the appended claims.

With the above and other objects in view, the present invention contemplates a stable aqueous solution consisting essentially of water having dissolved therein a partial ester of a steroid alcohol and a polybasic acid, an organic acid adapted to chelate formation is a slightly alkaline medium, and a substance selected from the group consisting of lower alkanol amines and the hydroxides, carbonates and acetates of sodium, potassium and ammonium, the amount of the organic acid being equal to at least twice the weight of the dissolved partial ester, and the amount of the substance being so chosen as to maintain the pH of the solution between 7 and 8.

According to a preferred embodiment of the present invention, the stable aqueous solution consists essentially of water having dissolved therein a partial ester of a steroid alcohol selected from the group consisting of corticosterone, dehydrocorticosterone, 17-hydrocorticosterone, cortisone, fluorohydrocortisone, 1-dehydrocortisone, prednisolone, dexamethasone and testosterone, and a polybasic acid selected from the group consisting of succinic acid, malic acid, fumaric acid, adipic acid, citric acid, tartaric acid, m-sulfobenzoic acid, m-phosphobenzoic acid and orthophosphoric acid; an organic acid adapted to chelate formation in a slightly alkaline medium, preferably selected from the group consisting of Khellino acetic acid and ethylenediaminetetraacetic acid; and monoethanolamine, the amount of the organic acid adapted to chelate formation in a slightly alkaline medium, preferably selected from the group consisting of Khellino acetic acid and ethylenediaminetetraacetic acid, being equal to at least twice the weight of the dissolved partial ester, and the amount of the monoethanolamine being so chosen as to maintain the pH of the solution between 7 and 8.

The present invention also contemplates a method of producing a stable aqueous solution of a partial ester of a steroid alcohol and a polybasic acid, comprising the steps of dissolving in water an organic acid adapted to chelate formation in a slightly alkaline medium, and a substance selected from the group consisting of alkanol amines and the hydroxides, carbonates and acetates of sodium, potassium and ammonium, the amount of the substance in the solution being so chosen as to maintain the pH of the solution between 7 and 8, and dissolving the partial ester in the solution.

According to a preferred embodiment, the method of the present invention consists in producing a stable aqueous solution of a partial ester of a steroid alcohol selected from the group consisting of corticosterone, dehydrocorticosterone, 17-hydrocorticosterone, cortisone, fluorohydrocortisone, 1-dehydrocortisone, prednisolone, dexamethasone and testosterone and a polybasic acid selected from the group consisting of succinic acid, malic acid, fumaric acid, adipic acid, tartaric acid, m-sulfobenzoic acid, m-phosphobenzoic acid and orthophosphoric acid and comprises the steps of dissolving in water either Khellino acetic acid or ethylenediaminetetraacetic acid as an organic acid adapted to chelate formation in a slightly alkaline medium, and monoethanolamine in an amount so chosen as to maintain the pH of said solution between 7 and 8; and dissolving at a temperature which generally will be room temperature and which should not exceed 20° C. and preferably will be between about 15 and 20° C., an amount of the partial ester in the thus-formed solution, which amount will be equal to between one-half and one-tenth of the weight of the Khellino acetic acid or ethylenediaminetetraacetic acid.

Surprisingly, it has been found according to the present invention that stable aqueous solutions of partial esters of steroid aclohols and polybasic acids can be obtained by dissolving these partial esters in an aqueous solution which contains a stabilizing component, namely an organic acid adapted to chelate formation in a slightly alkaline medium, preferably one of such acids described herein, and which solution also contains an alkanol amine, preferably a lower alkanol amine with up to 5 carbon atoms in the alkanol group, or a hydroxide carbonate or acetate of either sodium, potassium or ammonium. The pH of the solution in which the partial ester is to be dissolved is preferably adjusted to between 7 and 8 by suitably controlling the amount of the alkanol amine or hydroxide in the solution, and the solution is preferably formed and maintained at room temperature.

The partial esters which may thus be dissolved to form a stable solution are formed of steroid alcohols, such as corticosteroids and 9-fluoro derivatives thereof, or cortisone and 9-fluoro derivatives thereof, or of cholesterol, prednisone, prednisolone, cortisone, hydrocortisone, corticosterone, 1,1-dehydrocorticosterone, 17-hydroxycorticosterone, fluorohydrocortisone, 1-dehydrocortisone or prednisone, dexamethasone or testosterone, These steroid alcohols are esterified with polybasic acids, preferably di- or tricarboxylicacids, such as oxalic acid, maleic acid, citraconic acid, mesaconic acid, itaconic acid, aconitic acid, malic acid, succinic acid, maloic acid, fumaric acid, citric acid, tartaric acid, polycarboxylic acid derivatives of benzene, naphthaline and the like, and acids such as those mentioned above which, however, contain in place of one carboxyl group a sulfonic acid or phosphoric acid group, for instance, m-sulfobenzoic acid, m-phosphobenzoic acid or orthophosphoric acid.

In this manner, esters such as corticosterone-hemimalonate, corticosteronehemisuccinate, corticosteronehemimaleinate, corticosteronehemifumarate, mono- and dicorticosterone-citrate, corticosteronehemitartrate, corticosterone - m - sulfobenzoate, corticosterone-m-phosphobenzoate, mono- and dicorticosterone-ortho-phosphate, or the corresponding esters of other steroid alcohols, such as those referred to above, are obtained.

As a stabilizing component, an organic acid adapted to chelate formation in a slightly alkaline medium is included in the aqueous solution in which the partial ester of the steroid alcohol is dissolved.

Preferably, either ethylenediaminetetraacetic acid and/or Khellino acetic acid will be employed.

The formula of Khellino acetic acid is as follows:

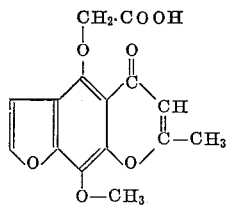

Khellino acetic acid may be produced in accordance with the method described in German Patent No. 952,899.

However, in addition to the above mentioned preferred stabilizing components or acids, it is also possible to use other organic acids which will tend to chelate formation in slightly alkaline media (pH between 7 and 8) without having a toxic effect. Thus, it is also possible to use as a stabilizing component citric acid, tartaric acid, malic acid, as carriers of hydroxyl groups, as well as polybasic acids containing one amino group, such as aspartic acid and the like.

Preferably an alkanol amine is dissolved in water together with the organic acid adapted to chelate formation, and serves to adjust the pH to between 7 and 8 so that the solution will be slightly alkaline. However, the alkanol amine may also be replaced by the hydroxide, carbonate or acetate of either sodium, potassium, or ammonium. Of the alkanol amines, preferably lower alkanol amines, i.e., such having up to 5 carbon atoms in the alkanol group will be used, and very good results are obtained by employing monoethanolamine. Either mono, di, or trialkanolamines may be used, however, it is of course essential in view of the final use of the solution that the alkanolamines are such which do not have any toxic effect.

The solutions of the present invention are preferably formed and stored at room temperature, most preferably within a temperature range of between about 15 and 20° C., or at somewhat lower temperature, since higher temperatures, particularly when the same are maintained for prolonged periods of time might have an unfavorable influence on the stability of the solution.

The amount of the stabilizing composition, i.e. chelating organic acid, forming part of the aqueous solution preferably will be equal to between twice and ten times or even more of the weight of the partial ester of the steroid alcohol and the polybasic acid. Very good results are obtained with an amount of stabilizing component which is equal to between about 3 and 4 times the weight of the partial ester.

The following examples are given as illustrative only of the present invention, without, however, limiting the invention to the specific details of the examples.

*Example 1*

| | Grams |
|---|---|
| Ethylenediaminetetraacetic acid | 3.4 |
| Monoethanolamine | 12.6 |
| Khellino acetic acid | 27.0 | are dissolved in 5 liters distilled water.

13.0 grams sodium-prednisolone-hemisuccinate are stirred into the thus-formed solution which is maintained at 20° C. In this manner, a clear, nearly colorless solution is formed having a pH of about 8, and it is found that the thus-formed solution can be maintained at room temperature for at least 25 months without showing any flocculation or separation.

*Example 2*

| | Grams |
|---|---|
| Ethylenediaminetetraacetic acid | 3.4 |
| Monoethanolamine | 13.1 |
| Khellino acetic acid | 27.0 |
| Glycocoll | 20.0 | are dissolved in 5 liters distilled water.

13.0 g. sodium-prednisolone-hemisuccinate are stirred into the thus formed solution which is maintained at a temperature of 20° C. In this manner, a clear, nearly colorless solution having a pH of about 8 is formed which can be maintained at room temperature for at least 25 months without showing any separation or flocculation.

*Example 3*

| | Grams |
|---|---|
| Ethylenediaminetetraacetic acid | 3.4 |
| Monoethanolamine | 12.6 |
| Khellino acetic acid | 27.0 | are dissolved in 5 liters distilled water.

13.0 grams sodium prednisolone metasulfobenzoate are stirred into the thus-formed solution which is maintained at 20° C. Thereby a clear, colorless solution having a pH of about 8 is formed which can be maintained for at least 25 months at room temperature without showing any separation or flocculation.

*Example 4*

| | Grams |
|---|---|
| Ethylenediaminetetraacetic acid | 3.4 |
| Monoethanolamine | 12.6 |
| Khellino acetic acid | 27.0 | are dissolved in 5 liters of distilled water.

4.5 grams of sodium-dexamethasone-m-sulfobenzoate are stirred into the thus formed solution, which is maintained at 20° C. A clear, colorless solution having a pH of about 8 is formed in this manner and can be maintained for at least 25 months at room temperature without showing any flocculation or separation.

*Example 5*

| | Grams |
|---|---|
| Ethylenediaminetetraacetic acid | 3.4 |
| Diethanolamine | 21.7 |
| Khellino acetic acid | 27.0 | are dissolved in 5 liters of distilled water and in the thus formed solution which is maintained at 20° C., 4.5 grams sodium-dexamethasone-m-sulfobenzoate are introduced under stirring, whereby a clear, nearly colorless solution having a pH of about 8 is formed which is stable for at least 25 months at room temperature without showing any flocculation or separation.

*Example 6*

| | Grams |
|---|---|
| Ethylenediaminetetraacetic acid | 3.4 |
| Triethanolamine | 30.45 |
| Khellino acetic acid | 27.0 | are dissolved in 5 liters distilled water and the thus formed solution is maintained at 20° C. during subsequent introduction under stirring of 4.5 grams sodium-dexamethasone-m-sulfobenzoate. A clear, nearly colorless solution is formed having a pH of about 8 which is stable at room temperature for at least 25 months without showing any separation or flocculation.

*Example 7*

3.4 grams ethylenediaminetetraacetic acid and 27.0 grams Khellino acetic acid are dissolved in 5 liters distilled water in which previously 8.25 grams sodium hydroxide had been dissolved. The mixture is stirred until a clear solution is formed. The thus formed clear solution is maintained at 20° C., and 4.5 grams sodium-dexamethasone-m-sulfobenzoate are then stirred into the clear solution, whereby a clear, nearly colorless solution having a pH of about 8 is formed which solution is stable at room temperature without flocculation or separation for at least 25 months.

Glycocoll is included in the solution of Example 2 for the excellent buffer effect of this substance in combination with alkalis and alkanolamines, whereby it is possible to maintain the desired pH range of, for instance, between 7.8 and 8.0 for prolonged periods of time.

The proportion or amount of stabilizer, i.e., of the respective organic acids which are adapted to chelate formation in a slight alkaline medium, which is given in the examples has been found to give very good results. However, it is also possible to obtain good results by increasing the amount of stabilizer to about twice the amount indicated in the examples, or to reduce the amount of stabilizer indicated in the examples by about 10%. Obviously, the proportion or amount of alkanolamines or hydroxides or the like must be adjusted to the amount of stabilizer so as to obtain the desired pH of between 7 and 8, and preferably between 7.8 and 8.0.

The amounts or proportions of the partial esters of steroid alcohols which are given in the examples represent approximately the maximum amounts or proportions thereof which are soluble in the respective solutions. It is of course desirable to form stable solutions of the highest possible concentrations and such solutions are described in the examples. Thus, the amounts or proportions of the partial esters could only be slightly increased above the figures given in the examples, however, it is of course possible to reduce the proportion of partial esters in the solutions to any desired extent and still to obtain stable solutions as described. It is preferred, of course, to incorporate in the solutions approximately the amounts or proportions of partially esterified steroid alcohols which are indicated in the examples.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A stable aqueous solution consisting essentially of water having dissolved therein a partial ester of a steroid alcohol selected from the group consisting of corticosterone, dehydrocorticosterone, 17 - hydrocorticosterone, cortisone, fluorohydrocortisone, 1-dehydrocortisone, prednisolone, dexamethasone and testosterone, and a polybasic acid selected from the group consisting of succinic acid, malic acid, fumaric acid, adipic acid, citric acid, tartaric acid, m-sulfobenzoic acid, m-phosphobenzoic acid and orthophosphoric acid; Khellino acetic acid; ethylenediaminetetraacetic acid; and a substance selected from the group consisting of lower alkanol amines and the hydroxides, carbonates and acetates of sodium, potassium and ammonium, the combined amount of said Khellino acetic acid and said ethylenediaminetetraacetic acid being equal to at least twice the weight of said dissolved partial ester, and the amount of said substance being so chosen as to maintain the pH of said solution between 7 and 8.

2. A stable aqueous solution consisting essentially of water having dissolved therein a partial ester of a steroid alcohol selected from the group consisting of corticosterone, dehydrocorticosterone, 17 - hydrocorticosterone, cortisone, fluorohydrocortisone, 1-dehydrocortisone, prednisolone, dexamethasone and testosterone and a polybasic acid selected from the group consisting of succinic acid, malic acid, fumaric acid, adipic acid, citric acid, tartaric acid, m-sulfobenzoic acid, m-phosphobenzoic acid and orthophosphoric acid; Khellino acetic acid; and monoethanolamine, the amount of said Khellino acetic acid being equal to at least twice the weight of said dissolved partial ester, and the amount of said monoethanolamine being so chosen as to maintain the pH of said solution between 7 and 8.

3. A stable aqueous solution consisting essentially of water having dissolved therein a partial ester of a steroid alcohol selected from the group consisting of corticosterone, dehydrocorticosterone, 17 - hydrocorticosterone, cortisone, fluorohydrocortisone, 1 - dehydrocortisone, prednisolone, dexamethasone and testosterone and a polybasic acid selected from the group consisting of succinic acid, malic acid, fumaric acid, adipic acid, citric acid, tartaric acid, m-sulfobenzoic acid, m-phosphobenzoic acid and orthophosphoric acid; ethylenediaminetetraacetic acid; Khellino acetic acid; and monoethanolamine, the combined amount of said Khellino acetic acid and said ethylenediaminetetraacetic acid being equal to at least twice the weight of said dissolved partial ester, and the amount of said monoethanolamine being so chosen as to maintain the pH of said solution between 7 and 8.

References Cited by the Examiner
UNITED STATES PATENTS 2,864,844 12/1958 Davisson _____ 260—433
2,871,160 1/1959 Johnson et al. _____ 167—77

OTHER REFERENCES

American Jour. of Pharmacy, August, 1952, page 287, Preparation of Stable Solutions of Crystalline Penicillin.

Sequestrene (1952), Geigy Industrial Chemicals, pages 31 to 33.

JULIAN S. LEVITT, *Primary Examiner.*

M. J. COHEN, *Assistant Examiner.*